O. E. GRAVES.
TIRE ATTACHMENT.
APPLICATION FILED OCT. 20, 1914.

1,145,305.

Patented July 6, 1915.

Oscar E. Graves, Inventor, by C. A. Snow & Co.
Attorneys.

Witnesses

UNITED STATES PATENT OFFICE.

OSCAR E. GRAVES, OF YUBA, WISCONSIN.

TIRE ATTACHMENT.

1,145,305. Specification of Letters Patent. Patented July 6, 1915.

Application filed October 20, 1914. Serial No. 867,641.

*To all whom it may concern:*

Be it known that I, OSCAR E. GRAVES, a citizen of the United States, residing at Yuba, in the county of Richland and State of Wisconsin, have invented a new and useful Tire Attachment, of which the following is a specification.

The device forming the subject matter of this application is a shield adapted to be applied to a tire for the purpose of enhancing the hold of the tire on the ground and for preventing a lateral skidding of the tire.

The invention aims specifically to provide a device of the type above described, made up of triangular links, connected to form parallel chains, the chains being interlocked in a novel manner with each other.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
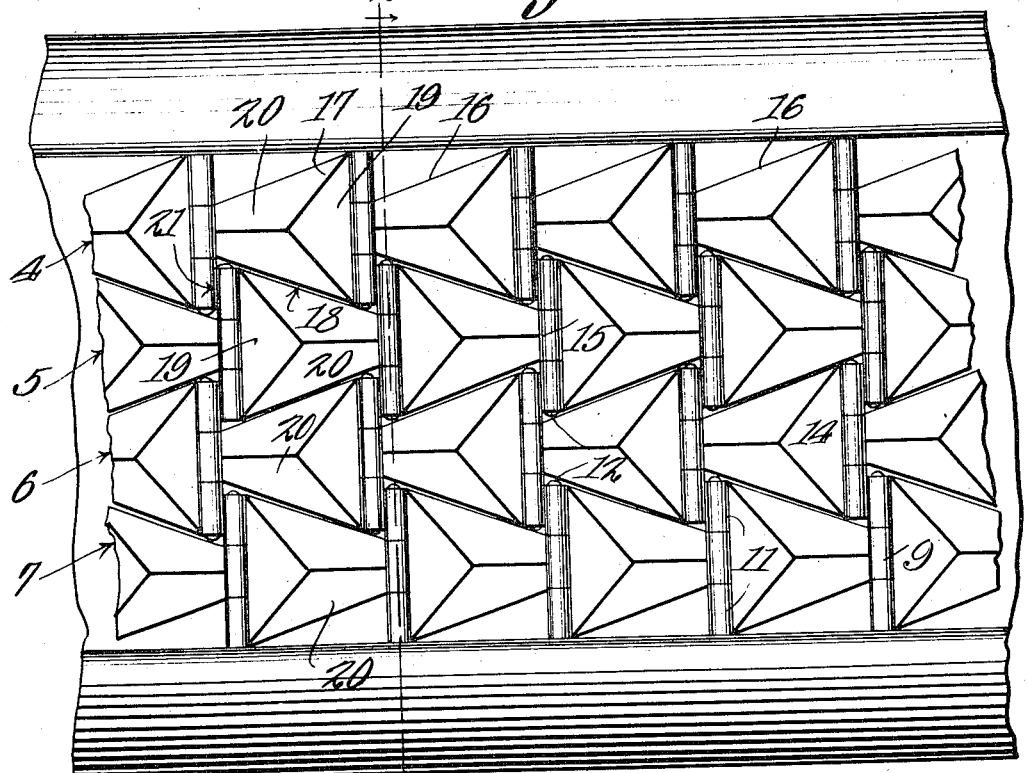
Figure 2:
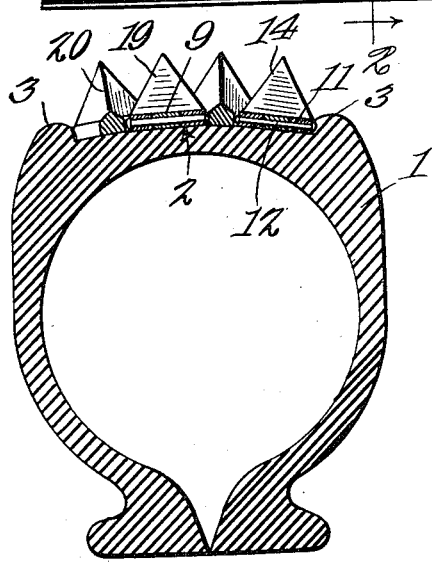
Figure 3:
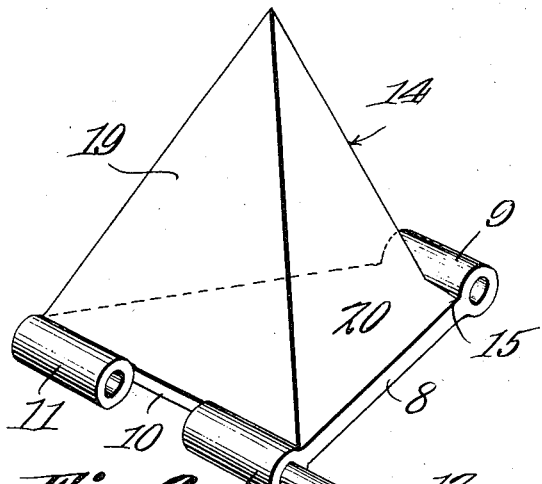

In the accompanying drawing:—Figure 1 is a top plan; Fig. 2 is a cross section on the line 2—2 of Fig. 1; Fig. 3 is a perspective view of one of the links.

In the drawings the numeral 1 indicates a tire provided with a longitudinal groove 2 in its tread portion, defining longitudinal ribs 3. It is between the ribs 3 and in the groove 2 that the protector or shield hereinafter described is located.

The protector or shield comprises any desired number of separate chains. In the present instance, but not of necessity, four chains are shown, the chains being denoted respectively by the reference characters 4, 5, 6 and 7 in Fig. 1 of the drawings. Each chain is made up of pivotally connected links, and each link denoted by the numeral 8 is in the form of a triangle. At the apex 15 of the link 8 is formed a knuckle 9. Upon that edge 10 of the link 8 which is opposite to the apex 15 are disposed knuckles 11 which are spaced apart to receive the knuckle 9 on an adjoining link. Pivot pins 12 or the like pass through the knuckles 11 and 9 and connect the links together. Upon each link 8 may be superposed a triangular pyramid 14.

Owing to the fact that the several chains 4, 5, 6 and 7 are made up of the triangular links above described, there is formed in the lateral edges of each chain, a plurality of reentrant angles 16 and a plurality of projecting angles 17. The apices 15 of the links 8 in the chain 4 all project in a common direction, longitudinally of the shield, say to the left, as shown in Fig. 1. The apices of the links of the chain 5 project to the right, those of the chain 6 project to the left, and those of the chain 7 project to the right. In this manner, the projecting angles 17 of one chain are received in the reentrant angles 16 of an adjoining chain, as clearly shown in Fig. 1 of the drawing. Practically the entire surface of the base of the groove 2 thus is covered, and the approaching, inclined edges of the links 8 of the respective chains are brought into close and intimate contact as shown at 18.

Certain of the slant faces 19 of the pyramids 14 in the respective chains slope in opposite directions, longitudinally of the shield. The other slant faces 20 of the pyramids in all of the chains coöperate to define a zig-zag area extended transversely of the protector, as clearly shown in Fig. 1. The points of the pyramids project prominently beyond the ribs 3 and owing to the specific arrangement of the parts as shown in Fig. 1, a tractive and anti-skidding surface of great efficiency is presented. Noting the point at which the reference character 21 is applied in Fig. 1, it will be observed that one knuckle 11 on each link of one chain bears against the corresponding knuckle on the adjacent link of the next chain. The several chains, therefore, are mutually interlocked and relative longitudinal movement between them is practically impossible.

Having thus described the invention, what is claimed is:—

1. A tire shield comprising separate chains located side by side and made up respectively of pivotally connected triangular links defining interengaged reentrant and projecting angles in the lateral edges of the separate chains.

2. A tire shield comprising separate chains located side by side and made up respectively of pivotally connected triangular pyramids defining interengaged reentrant and projecting angles in the lateral edges of the separate chains.

3. A tire shield made up of a plurality of longitudinal lines of connected triangular pyramids, certain of the slant faces of the pyramids in the respective lines sloping in opposite directions longitudinally of the shield, and the other slant faces of the pyramids in all of the lines coöperating to define a zig-zag area extended transversely of the shield.

4. A tire shield embodying a chain made up of triangular pyramids, one basal angle of each pyramid being connected pivotally with the intermediate portion of one edge of an adjoining pyramid.

In testimony that I claim the foregoing as my own, I have hereto affixed my signature in the presence of two witnesses.

OSCAR E. GRAVES.

Witnesses:
GEORGE O. RICHARDSON,
SAM C. McCAULEY.